July 11, 1967     T. C. BARBER     3,330,501

AIRPLANE CONSTRUCTION

Filed Sept. 27, 1965     6 Sheets-Sheet 1

INVENTOR.
THEODORE C. BARBER

ATTORNEYS

July 11, 1967 T. C. BARBER 3,330,501
AIRPLANE CONSTRUCTION
Filed Sept. 27, 1965 6 Sheets-Sheet 2

INVENTOR.
THEODORE C. BARBER
BY
ATTORNEYS

July 11, 1967 T. C. BARBER 3,330,501
AIRPLANE CONSTRUCTION
Filed Sept. 27, 1965 6 Sheets-Sheet 3

INVENTOR.
THEODORE C. BARBER
BY
ATTORNEYS

July 11, 1967

T. C. BARBER 3,330,501

AIRPLANE CONSTRUCTION

Filed Sept. 27, 1965

INVENTOR.
THEODORE C. BARBER
BY
ATTORNEYS

INVENTOR.
THEODORE C. BARBER
BY
ATTORNEYS

July 11, 1967 T. C. BARBER 3,330,501
AIRPLANE CONSTRUCTION
Filed Sept. 27, 1965 6 Sheets-Sheet 6

*INVENTOR.*
THEODORE C. BARBER
BY
ATTORNEYS

United States Patent Office 3,330,501
Patented July 11, 1967

3,330,501
AIRPLANE CONSTRUCTION
Theodore C. Barber, Star Rte., Box 5,
Winnemucca, Nev. 89445
Filed Sept. 27, 1965, Ser. No. 490,510
7 Claims. (Cl. 244—47)

My invention relates to an improved airplane and more in particular to an airplane designed to take off at relatively low speeds under conditions of maximum stability and to fly at relatively high speeds with greatly reduced drag in an aerodynamically stable condition at the relatively high air flying speed. My invention is particularly adapted for use with relatively smaller, lighter aircraft of the type commonly used for private purposes, but is not necessarily limited to such aircraft.

It is well know that the design of any airplane is based upon a series of compromises of characteristics which are normally incompatible in the same airplane. Thus, for example, very high speeds are usually obtained in aircraft having an extremely small angle of attack, small angle of incidence and minimum drag. Such aircraft, however, tend to be extremely unstable at low speeds so that it is necessary to take off and land at speeds which would have been considered in the unsafe category a few years ago. Indeed, the flying of many modern airplanes would be impossible if it were not for the fact that aircraft runways were increased in length. Even then, such aircraft must be "flown in"; that is to say, brought in for a landing with at least partial "throttle" and placed over the runway in such a position that when the engine power is decreased to idling speed, the airplane will immediately "pancake" to the surface of the runway. While such aircraft are adequately dynamically stable under flying conditions, they contribute markedly to a generally unsafe condition which has developed, in that it is a practical impossibility to land them in an open field on a forced landing under emergency conditions without endangering the lives of all of the passengers.

The flying and landing characteristics of modern aircraft may be compared with the performance of aircraft of only 30 years ago in which landing and takeoff speeds were relatively low, and an emergency landing could usually be made without danger of loss of life in any reasonably large, relatively flat field whether provided with a runway or not. It must be admitted that in the demand for greater speed, it has been absolutely essential in modern design to decrease drag while at the same time increasing the power output of engines, and generally speaking, drag has been decreased not only by changing the wing design, but also by changing the angle at which the airfoil is set to the fuselage, including the angle of incidence and dihedral and also, of course, by providing for a smaller angle of attack with greater sweepback of the wings. Attempts have been made to provide adjustable wings, particularly for the purpose of increasing the angle of incidence to provide greater lift during landing, and in some cases, also, to vary the angle of attack. These attempts have either failed to meet with complete success, or where they have been successful on large military and commercial aircraft, the resulting design has been incapable of use in smaller-type planes commonly used for business and pleasure purposes by individual and private business groups.

Accordingly, the principal object of my invention is the provision of an improved aircraft.

Another object is the provision of an improved design of airplane which permits relatively very low landing speeds and takeoff speeds, but which will permit relatively very high speeds while the airplane in in flight, consistent with the power of the airplane engine.

Still another object of the invention is the provision of an airplane in which the attitude of the wings with respect to the fuselage and line of flight may automatically move from one position to another, depending upon the speed of the aircraft, to provide for relatively low takeoff and landing speeds with maximum drag, and relatively very high flying speeds with minimum drag.

A further object of the invention is the provision of an airplane in accordance with an object set out immediately hereinabove, wherein the wings may be fixed at any desired attitude within the parameters of the design, and the plane flown both on takeoff and landing, as well as in the air, with the wings supported at such attitude.

A still further object of the invention is to link up both the wings and horizontal stabilizers of the empennage to provide for maximum lift on takeoff and minimum lift during normal flight of both the wing and empennage airfoils.

Still a further object is the provision of an airplane of the type identified, in which the wings, with the horizontal stabilizer surfaces, if desired, may be supported for automatic adjustment for takeoff and flying conditions or may be adjusted manually to any desired position within the parameters of the overall design.

In accordance with the main features of the invention, I support the airfoils comprising the wings on the fuselage through pivotal connections, in which the axis of the wing pivots defines an angle to the vertical (illustratively 10° to 30°) in a plane running transversely of the fuselage, and with such axis also at an angle to the vertical in a plane running longitudinally of the fuselage, so that the wings when at rest or in normal landing position have a pronounced dihedral and relatively great angle of incidence with substantially no sweepback; but wherein as the speed of the airplane increases, the wings are adapted to rotate on their said pivots to reduce the dihedral angle to approximately zero or even slightly negative dihedral, to decrease the angle of incidence, to provide a maximum sweepback, lower effective aspect ratio and reduced drag for higher speeds during sustained flight when the plane is in the air and its normal flying or cruising speed has been reached. Preferably, also, I provide horizontal stabilizers supported in the same general manner as the wings and connected to the wings mechanically to provide sweepback and very low to zero lift at the empennage when flying speed has been attained. Advantageously, a relatively stationary airfoil of generally triangular shape is provided at the inner end of each wing and at the inner end of each horizontal stabilizer, said airfoil telescoping with respect to the wing or horizontal stabilizer as the wings and stabilizer are moved to sweepback position. The said triangular or filler airfoils suitably are pivoted with respect to the airfoils with which they are associated, so that the filler airfoils define angles generally consistent with the angles of the airfoils as they are adjusted either automatically or manually.

Other specific objects and features of the invention will be apparent from the following detailed description taken with the accompanying drawings, wherein FIG. 1 is a plan view of a relatively light private type of plane utilizing the novel features of my invention, the airfoils being shown in the position which they assume at very low landing speeds or when at rest on the ground;

Figure 1:
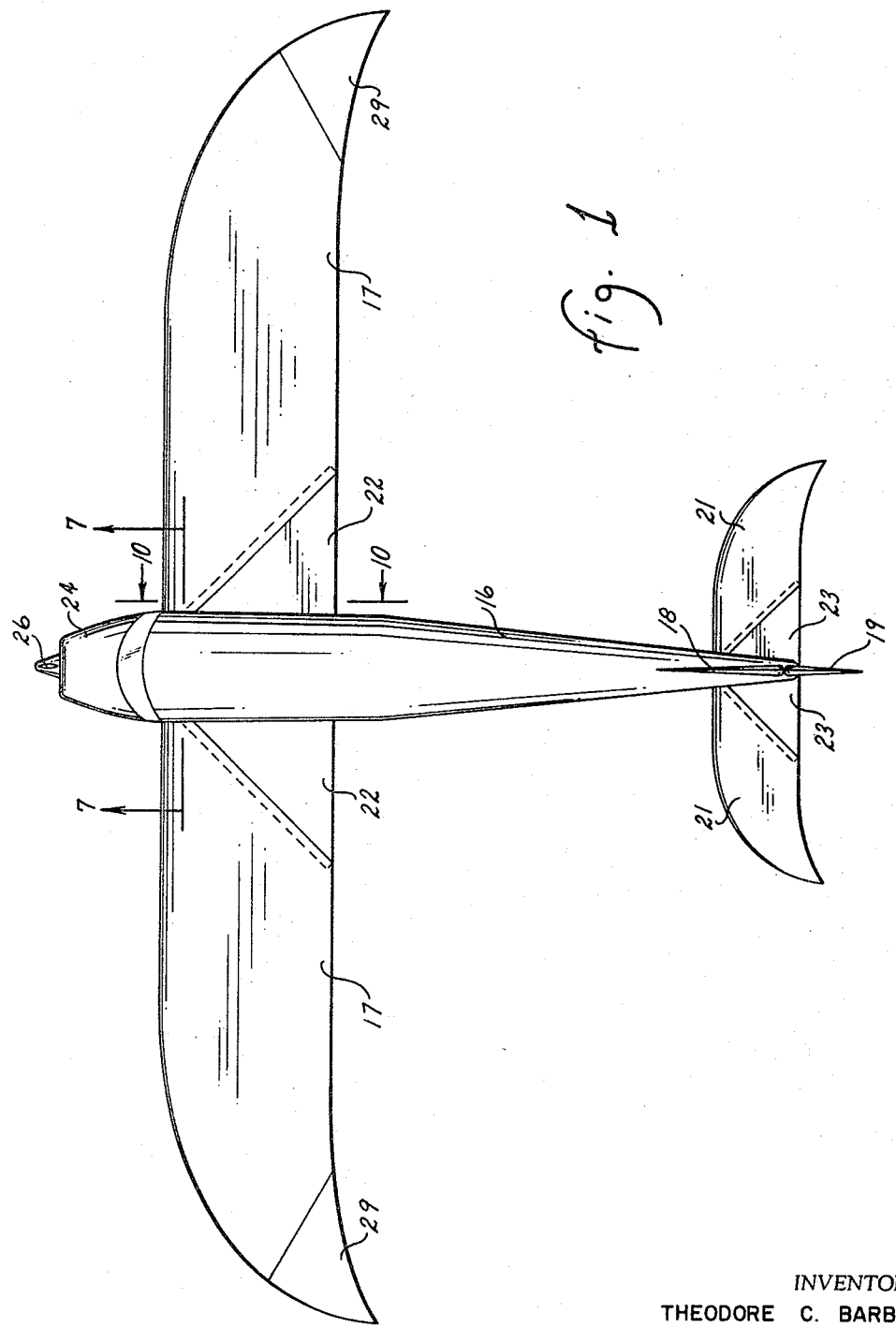

Before going to a full description of the plane as shown in the drawings, I wish to point out that for convenience, all of the drawings are in part schematic, it being considered unnecessary for the purpose of the present invention to show all details of construction, particularly of frame members, control elements, control cables, and other structural features and appurtenances, all of which are well known, well understood and, in many respects, conventional on aircraft of the type shown in the present case. While size, weight, engine horse power, and the like, may vary over a wide range, the plane shown is of a common size to carry two, three or four passengers and intended for private use and classed as a private business or professional plane, as contrasted with planes intended for commercial airline use.

Referring now to the drawings, the airplane of the present invention utilizes a suitably shaped fuselage 16, a pair of special wings 17, which will be described more in detail below, a vertical stabilizer 18, rudder 19, and pair of horizontal stabilizers 21 forming a part of the empennage. Associated with the wings 17 are a pair of filler airfoils 22, and a similar pair of filler airfoils 23 also comprise a part of the empennage. The airplane is of the tractor type with a suitable engine contained within cowling 24 driving a propeller 26. The landing gear may be of any suitable type but I show a tricycle landing gear with a suitably supported nose wheel 27 and supporting wheels 28, which may or may not be retractable depending upon the design. The wings are provided with ailerons 29, operated by conventional types of controls, and of course the rudder 19 is also operated by a suitable control, conventionally a "stick" in the former case, and a foot-operated rudder pedal of conventional type in the case of the rubber 19. While by suitable design the airplane of the present construction may utilize conventional elevators, I have found it possible to use the horizontal stabilizers 21 themselves as elevators, as will be explained. They, of course, may also be operated by forward and reverse movement of the same stick (not shown) conventionally used for operation of the ailerons. The system of cables and/or rods and arms used in such controls are so standard that I have not shown them because to show them would not comprise a part of the present invention and would unduly complicate the showing of the claimed invention.

Figure 2:
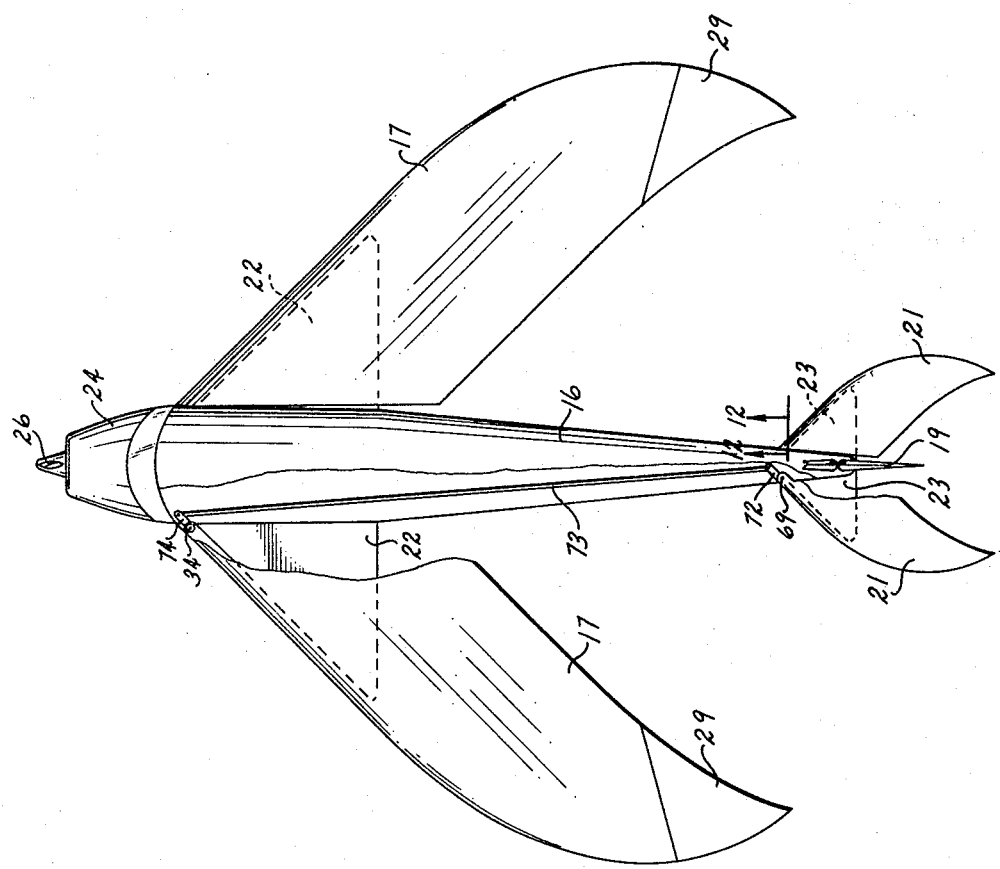
FIG. 2 is a view similar to FIG. 1 but showing the position of the airfoils when the plane is in relatively high-speed flight, part of the pin of the fuselage being broken away to illustrate one form of connection between the wings and horizontal stabilizers to cause them to function simultaneously as flight conditions change.

Looking a FIGS. 1 and 2, it will be apparent at once that in the position shown in FIG. 1, the wings are not swept back but extend at right angles to the axis of the fuselage in a conventional manner; while in FIG. 2, the wings have a considerable sweepback, the amount of sweepback being determined by the desired design. In FIG. 2, in accordance with the design shown, the wings are at maximum sweepback position for top-speed-level flight. Looking at FIGS. 3 and 4, it will also be apparent that in the first figure, the wings have considerable dihedral to add to the stability of the aircraft at low speeds encountered during landing and takeoff; whereas in FIG. 4 there is either no dihedral or even a slightly negative dihedral, which provides the most favorable aerodynamic attitude for high-speed flight. Similarly, in FIG. 3, the relatively very large amount of the bottom of the wing there appearing indicates a very great angle of incidence, while in FIG. 4 the angle of incidence has been reduced to the minimum amount, consistent with the design of the wing. It is, of course, well understood that many types of wings have been designed with different characteristics and utilizable on various types of planes to secure various results. Illustratively, most wings for relatively lower-speed aircraft have their maximum thickness near the entering edge and their minimum thickness at the trailing edge, with some fair amount of camber both on the upper wing surface and bottom wing surface. Conventionally, these wings have center of lift at a forward position during slow speeds, but the center of lift moves backwardly as the speed is increased. In general, also, up to about 75 percent of the lift occurs at the upper surface and as low as 25 percent at the lower surface of the wing, with some modification in this relationship as the speed changes. The present invention is not particularly concerned with the cross-section of the cord of the wing except that it should be selected to give good results and adequate support at the speed for which the aircraft is designed. As will be noted also by a comparison of FIGS. 1 and 2, the aspect ratio of the wings is, in effect, reduced at high speed, giving an effect somewhat similar to "clipping" the wings, a practice which was engaged in some years ago to increase air speed, but which unfortunately also increased landing speed. The aspect ratio in the present airplane, of course, is increased on landing, thus obtaining the advantages of the so-called "clipped" wing, without the disadvantages thereof.

The various positions of the wing contributing to the features and advantages of the present invention are obtained by rotatably supporting the inner end of the wing at approximately the position of its leading edge where the wing spar is suitably and preferably positioned. The axis of the pivotal support is inclined in two directions, generally at an angle of about 20 percent to the perpendicular in each instance with results which will be explained. It should be borne in mind, however, that this particular angle may vary, depending upon the extremes of adjustability, whether automatic or manual, which may be desired. For convenience, I have shown the supports for the wings, and for the filler airfoils and horizontal stabilizers partly schematically. Those skilled in the art will understand that from a practical standpoint, it is desired that all details of construction be selected to provide the minimum of weight consistent with safety, but in the showing of the present invention, I have attempted primarily to show the structure so that the function thereof can readily be understood.

Figure 7:
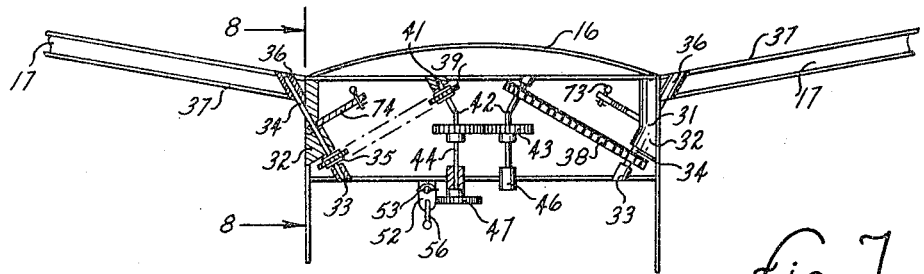
FIG. 7 is a transverse sectional view, partly schematic, taken along the line 7—7 of FIG. 1, showing the manner in which the wings are supported.
Figure 9:
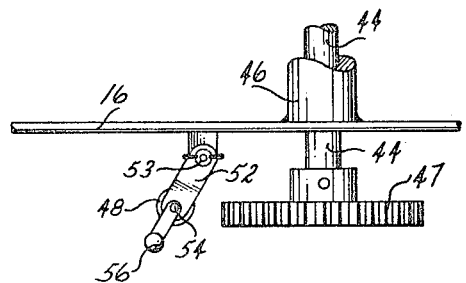
FIG. 9 is a slightly enlarged fragmentary elevational view showing a part of FIG. 7, and illustrating the manner in which the manual controls for the position of the wings may be disconnected.
Figure 8:
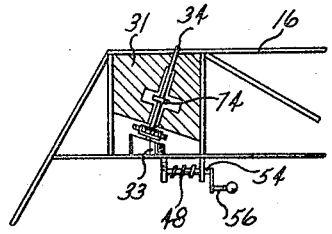
FIG. 8 is a fragmentary sectional view taken on the line 8—8 of FIG. 7.
Figure 10:
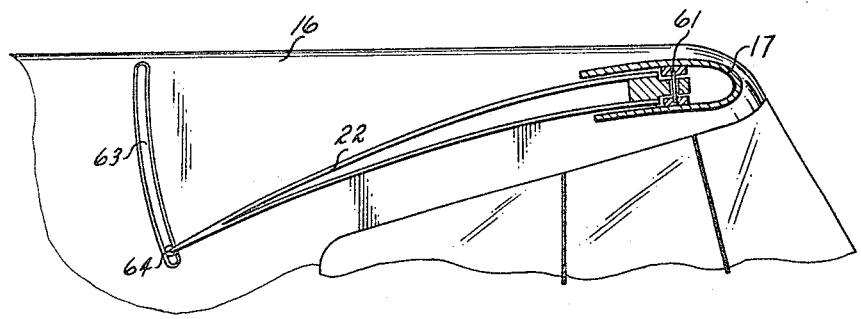
FIG. 10 is a transverse sectional view taken on the line 10—10 of FIG. 1 showing the manner in which a triangular filler foil is supported on both the wing and fuselage.

Looking now first to FIG. 7, and some of the figures immediately related to it, the frame of the fuselage 16, which for convenience may be formed of tubular pipe, has a pair of brackets 31 secured thereto, the brackets being shaped to engage a sufficient portion of the fuselage frame to provide a firm support. To the brackets 31 attach an upper tube 32 and a lower tube 33 equipped with ball bearings (not shown) and adapted to support a pivot pin 34 carried by the wing 17 and also supported by a bracket 36 rooted to the front spar 37 of the wing so that the wing is firmly supported on the pivot pin 34. Each pivot pin 34 carries a sprocket gear 35 meshing with a sprocket chain 38 engaging a sprocket 39 on a suitably supported shaft 41 carried by a bracket on the fuselage. The shaft 41 is connected by universal joint 42 in each instance which carries a gear 43, the two gears 43 being in mesh, so that the wings will always move together regardless of the conditions encountered. Gears 43 are pinned on shafts 44 which are journaled in journal boxes 46, and one of these shafts 44 carries a worm wheel 47 meshing with a worm 48 (see FIG. 9) carried on an arm 51 pivoted with respect to a supporting arm 52 and capable of being held in adjustable position by a wing nut 53. The worm 48 is also carried on a suitable shaft 54 journaled in the arm 51, and this shaft carries a crank 56 which permits the worm 48 to be turned by hand. By removing the worm 48 from contact with the worm wheel 47, as shown in FIG. 9, the wings are free to move automatically under the forces encountered in takeoff, in flight and in landing, as will be described. When, however, the worm is moved over into engagement with the worm wheel 47, the wings will be held in the position which they occupy at the time of engagement unless or until they are adjusted manually by operation of the crank 56. It will be understood that this arrangement is illustrative, and in actual practice somewhat more sophisticated structural features are utilized, both for adjusting the position of the airfoils, and for anchoring them in the position desired.

Figure 11:
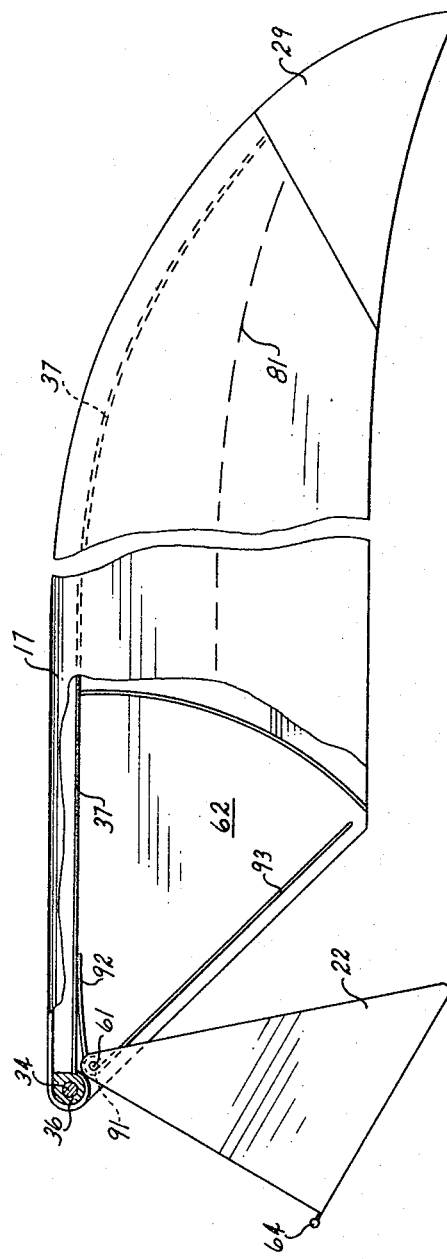
FIG. 11 is a fragmentary view showing the right wing and triangular filler foil separated from the fuselage and indicating features of support and construction.

Still considering the wings, it will be noted by particular reference to FIG. 11, that the filler airfoil 22 has one end pivoted to the wing on a suitable pivot 61 and that at rest position, one end of the generally triangular filler airfoil 22 projects slightly within an end recess 62 in the wing 17 (see FIG. 1), it being understood of course that the wings are identical on both sides except that one is a mirror image of the other. In describing the construction, therefore, reference will be made only to a single wing and it will be unnecessary to refer either to the right wing or the left wing except as the text may indicate the need to do so.

Figure 3:
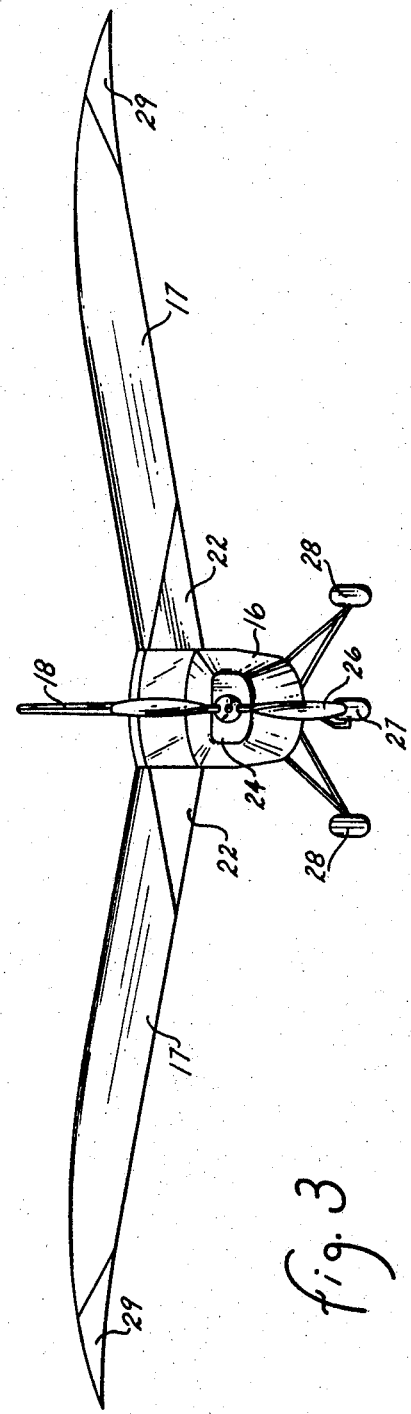
FIG. 3 is a front elevational view of the airplane as shown in FIG. 1, the wings here also being in the normal landing position.
Figure 4:
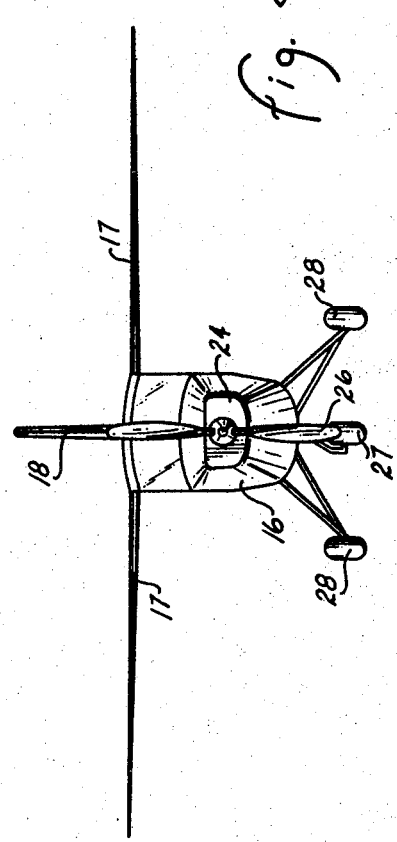
FIG. 4 is a front elevational view similar to FIG. 3, but showing the approximate position of the wings when in full high-speed flight.
Figure 5:
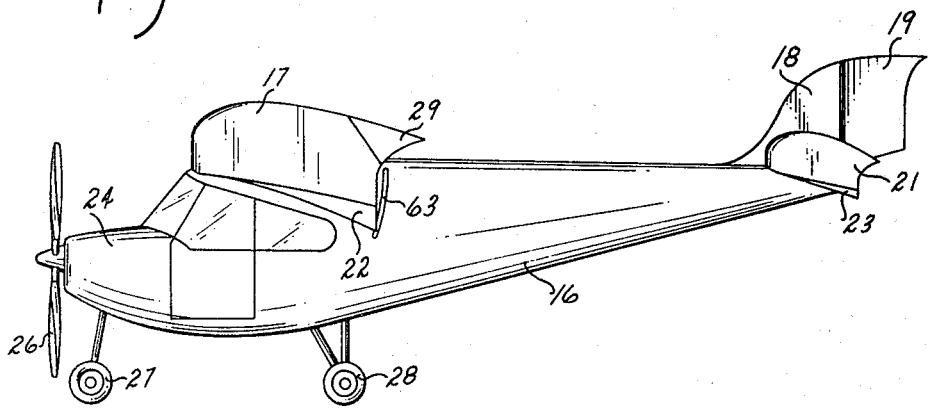
FIG. 5 is a side elevational view showing the airplane on the ground.

By reference to FIGS. 3 and 4, it will at once be apparent that the filler airfoil 22 changes its angle of incidence with the changing angle of incidence of the wing 17, and that, therefore, it must be secured to the fuselage in such a way as to permit this change. To accomplish this objective, a bracket with a generally arcuate recess 63 is provided at the side of the fuselage, and a headed pin 64 on the unpivoted end of the filler airfoil is secured in this arcuate slot which overlaps the head and holds the filler airfoil in firm, but adjustable, relationship with respect to the fuselage. As the angle of incidence is decreased, the head of the pin and the pin itself (64) ride upwardly toward the top of the slot 63. Because of the angle of the pivot supporting the wing, the dihedral is simultaneously modified, and adjustment for the changed position of the wing as the dihedral is modified can take place merely by pivotal action around the head of the pin 64.

Figure 12:
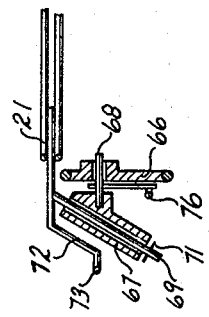
FIG. 12 is a sectional view, partly in elevation, showing one manner in which the horizontal stabilizer may be supported to function as an elevator when the climbing attitude of the plane is to be modified.

It has already been pointed out that while the airplane of the present invention may have any conventional type of empennage of suitable design associated with the adjustable airfoils comprising the wings, it has been found advantageous to utilize horizontal stabilizers 21 which also change position with the wings except that, generally speaking, the two airfoils will normally be in the same plane, rather than together defining a dihedral angle less than 180 degrees, such as is the case with the wings. FIG. 12 illustrates in a simple fashion one manner in which the horizontal stabilizers may be supported, it being understood that while only a single stabilizer is shown in FIG. 12, the identical construction in mirror relationship will be used for the other stabilizer. Here a bracket 66 is suitably supported on the framework of the fuselage, said framework comprising a series of longerons or stringers, depending upon the details of frame construction. A generally tubular journal bearing member 67 is carried on a pivot pin 68 which extends through the bracket 66. A supporting pivot pin 69 carried by the horizontal stabilizer 21 is journaled in the bearing member 67 and is held in rotatable, but non-removable, position by a pin 71 projecting from the pin 69. A radial arm 72 suitably secured to the pivot pin 69 is connected by means of a rod 73 (FIGS. 2 and 7) which in turn has its opposite end connected to an arm 74 which projects from the pivot pin 34 which supports the wing. Thus, as the wing 17 changes position, such as when its aspect ratio is decreased and the wings are carried to a swept back position as shown in FIG. 2, the stabilizers 21 will be moved correspondingly as also shown in FIG. 2. The axis of the pin 69 is also so positioned that the angle of incidence of the horizontal stabilizers is decreased as the angle of incidence of the wings is decreased. The net result which can be obtained is that the wings will carry substantially the entire load at high speeds, the stabilizers 21 being in the slip stream of the wings and carrying substantially no load, except as they may be employed for modifying the climbing angle of the plane as will be described.

It will be noted that the point of connection of the rod 73 to the arm 72 is substantially in line with the pivot pin 68, and by utilizing a universal joint connection (with a spring extension of the rod if needed, which spring extension or equivalent is not shown in the drawings), it is possible to rotate the entire assembly including the journal bearing member 67 and horizontal stabilizer 21 about the pivot pin 68. Such rotation may be accomplished by means of a suitably projecting arm 76 to which may be connected a conventional type of rod (not shown) which may be moved longitudinally in response to forward and backward movement of a control member such as an ordinary stick control. By this means, the angle of the stabilizers 21 may be changed to either lower or raise the tail portion to put the airplane as a whole into a climbing position or nose-down position at the will of the pilot.

Figure 6:
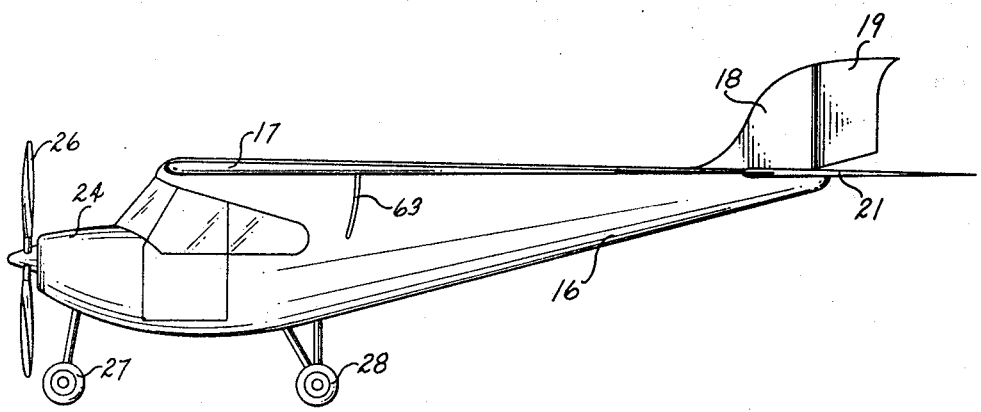
FIG. 6 is a view similar to FIG. 5 but showing the airplane in the air and in normal flying position.

As FIG. 6 shows, the rudder 19 may be mounted sufficiently rearwardly of the horizontal stabilizers 21 and filler airfoils 23, both forming part of the empennage surfaces, so that conventional movement of the rudder can always take place. As in the case of the wings 17 and filler airfoils 22, so also in the case of the horizontal stabilizers 21 and the filler airfoils 23, a telescoping relation exists such that the filler airfoil 23 enters a recess in the stabilizer 21, and may move up and down with the stabilizer whatever the movement of the stabilizer may be. Since the construction which permits this action may be substantially identical with that shown in connection with the wings, I have not shown this construction in detail so far as the tail surfaces are concerned, but only indicated them generally in the drawings. It should be noted, for example, that when the stabilizers 21 function as "flippers," the filler airfoils 23 will also operate in the same manner so that undesirable turbulence at the point of contact between these two airfoils will be avoided.

As I have already pointed out, a preferred type of wing used with the airplane of the present invention is one utilizing a fair amount of camber, and also one which provides a curved sweepback portion at the region of the ailerons, with certain very definite advantages so far as aileron control is concerned, and more markedly modifying the aspect ratio when the wings are in their maximum sweepback position. I also provide a suitable wing construction, several of which are known, to permit automatic decrease in camber and straightening out of the top and bottom surfaces of the wings, as indicated by the broken line 81 in FIG. 11. Suitably also, the wing has at least one forward rounded spar 82 to provide for maximum strength at the point of pivot of the wing to the fuselage, and also for the point of pivot of the generally triangular filler airfoil 22 to the wing itself. One suitable and conventional method for providing automatic wing deflection along the broken line 81 is to utilize a series of vanes either broken or capable of being flexed along the line 81, with spring means to hold the wing in the position of maximum camber when it is at rest but to permit upper relative flection of the trailing edge portion of the wing with respect to the forward or entering edge section. One very old but conventional method of accomplishing this result is to provide a wing in two parts pivoted with respect to each other with spring means between the two parts to permit the desired automatic straightening out of the wing. Preferably, however, I utilize a construction in which the entire mechanism is enclosed within the skin of the wing, and utilize for the wing covering one of the modern flexible plastic materials, optionally a very thin foam plastic which is slightly stretched as it is applied over the wing frame and can therefore adjust itself to the position of the two wing parts. By utilizing a special wing of this type, greater air speed at maximum power, or cruising power is obtained without the undesirable characteristics of two-part wings heretofore encountered, particularly during conditions of maximum air turbulence.

By means of the present invention, it is easily possible to produce a relatively light and relatively inexpensive private-type plane which will land and take off at as low as thirty miles an hour air speed, but which will cruise easily at 200 miles per hour or more, a range which has been impossible with aircraft as heretofore designed. Moreover, while I may provide for manual control of the wing positions, which manual control would be used when a condition of marginal design might be indicated, the plane of the present invention may be entirely automatic in its action. To maintain maximum stability, particularly during conditions encountered in rough air, it may be desirable at all times to provide some means for anchoring the airfoils in a desired adjusted position.

The dihedral provided as shown in FIGURE 3 not only causes improved stability at low speeds, but it tends to hold the wings in forward position at slow speeds, particularly when it is considered that at such slow speeds, the center of lift is well toward the leading edge of the wing, and there is relatively little load application such as to cause the wings to assume the position shown in FIG. 2. As speed is increased, however, the center of lift moves backwardly, applying greater loading to the wings closer to the trailing edge, and therefore tending to straighten out the wings and reduce the angle of incidence and drag. This action is progressive as the speed is increased, and the only way the wings can react to assume the position which they tend to take as the loading conditions vary, is to rotate about their pivot pins 34 to decrease the aspect ratio and move the wings to a condition of sweepback such as shown in FIG. 2, or to such position as may be possible consistent with the particular design employed. When the wings move in this manner, they tend to break or straighten out around the broken line 81 (FIG. 11) so that the camber of the wing is reduced, as well as its angle of incidence. Simultaneously, the dihedral angle is reduced to either the position shown in FIG. 4, or even to a condition of slightly negative dihedral if the design would indicate an advantage of such a wing position. Reduced dihedral will, of course, decrease aerodynamic stability at low speeds, but will tend to improve performance very greatly at high speeds. The net result is to reduce drag to a minimum and permit the plane to develop maximum speeds and cruising speeds which would be impossible with a plane having anything like the takeoff and landing speed postulated hereinabove.

Employing the specific design shown in the drawings, the automatic adjustment of the wings would be provided for by taking the worm 48 out of contact with the worm wheel 47, that is to say placing these two parts in the relative position shown in FIG. 9. When the plane had reached its maximum cruising speed, however, it might be desirable to re-engage the worm 48 and worm wheel 47 to hold the airfoils in the position for maximum performance at high speeds, until of course it would be desired to land the aircraft. When the aircraft would be landed, the opposite action would occur from that on take-off, the center of lift on the wings moving forwardly, permitting them to rotate in a direction to provide maximum angle of incidence and maximum aspect ratio together with maximum dihedral provided for in the design. It is, of course, obvious that as the wing is shown, there is a natural tendency for the dihedral to be re-established because of the forces involved, and also the design of the wing would be such that the maximum camber of the wing and therefore its maximum lift would again be re-established, all of which would again permit landing of the aircraft at a minimum air speed.

I have explained that while the entire empennage with its tail surfaces may be of a conventional type, better results are obtained with the plane of the present invention when the horizontal stabilizers are adjusted to decrease their aspect ratio and decrease their angle of incidence and lift at slow take-off and landing speeds. Preferably, these changes in the positions of the stabilizers 21 are obtained by taking advantage of the movement of the wings 17 through the intervention of the operating or control rods 73 leading back to the pivotal supports for the stabilizers. When the airplane of the present invention is in level flight, there is practically no load on the tail surfaces and therefore substantially no drag. While conventional flippers or elevators may be employed, it is relatively simple to utilize the adjustable horizontal stabilizers with a conventional elevator. Those skilled in the art are aware that horizontal stabilizers are sometimes made manually adjustable to facilitate takeoff and landing, being used principally in the case of landing, because to great an angular adjustment of conventional horizontal stabilizers during takeoff is usually unsatisfactory, causing heavy tail problems as takeoff speed increases. In the case of the present invention, the horizontal stabilizers automatically take a position facilitating takeoff and landing, but they have the advantage that as speed is increased, the lift is automatically decreased and there is no possibility of causing the plane to be extremely tail heavy or even to go into a loop maneuver because of failure to properly set a manual adjustment. It should be borne in mind, however, that in addition to the automatic adjustment which I provide for, it is possible to provide a somewhat increased manual adjustment if desired, or to utilize any of the other features of construction and design known in the industry which are not inconsistent with the operation of the aircraft as described.

Because of the aspect of the wings and the manner in which they are pivoted, they may be caused to return automatically to landing position. It may be desired to employ a design, however, in which some assistance is provided other than mere shifting of the area of lift at slow speeds to return the wings to high aspect ratio, high angle of incidence and definite positive dihedral position. To facilitate return of the wings in such case, I may employ any suitable means to bias them normally to landing position, such as by means of a spring as shown in FIG. 11. Here a coil spring 91 extends around the pivot pin of the filler airfoil 22, and has one end 92 engaged against one edge of recess 62, and another end 93 disposed near the entrance of said recess when the maximum aspect ratio prevails. Thus, as the wing 17 moves back and the foil 22 enters recess 62, the coil spring 91 is tensioned, and the end 93, being relatively long, gently biases the entire wing to normal landing position and assists in its return. Indeed, the spring may be made strong enough to comprise the major force returning the wings to landing position as speed is decreased. At the same time, there is not only increased lift at the wings but also at the horizontal stabilizers, and landing is simplified by this means also, because the tail is now lifting part of the load and tends to hold the tail in good landing position.

I have shown a specific embodiment of my invention and described the same in considerable detail so that those skilled in the art might understand the manner of employing the same, but the scope of the invention is defined by the claims.

What is claimed is:
1. In an airplane of the character described,
 (a) a fuselage,
 (b) a pair of wings pivotally supported on a pivot axis by said fuselage near their entering edges,
 (c) the said pivot axis defining an angle to the vertical in a plane transverse to the fuselage and an angle to the vertical in a plane running longitudinally of the fuselage,
 (d) said pivot axis causing said wings to define a high angle of incidence and dihedral angle at maximum aspect ratios, whereby stable low landing and takeoff speeds are normal,
 (e) said winds automatically pivoting to sweepback position with low angle of incidence and low aspect ratio as air speed increases, and
 (f) a generally triangular filled airfoil pivoted to each wing and movable into an end recess in such wing as it moves to sweepback position.

2. In an airplane of the character described,
 (a) a fuselage,
 (b) a pair of wings pivotally supported on a pivot axis by said fuselage near their entering edges,
 (c) the said pivot axis defining an angle to the vertical in a plane transverse to the fuselage and an angle to the vertical in a plane running longitudinally of the fuselage,
 (d) said pivot axis causing said wings to define a high angle of incidence and dihedral angle at maximum aspect ratios, whereby stable low landing and take-off speeds are normal,
 (e) said wings automatically pivoting to sweepback position with low angle of incidence and low aspect ratio as air speed increases,
 (f) a generally triangular filler airfoil pivoted to each wing and movable into an end recess in such wing as it moves to sweepback position, and
 (g) means providing a generally arcuate connection between the fuselage and an unpivoted portion of said filler airfoil to permit the same to adjust to the fuselage as the wing so adjusts.

3. An airplane as defined in claim 2, including means for automatically reducing wing camber as airplane air speed increases.

4. An airplane as defined in claim 2, including a pair of horizontal tail stabilizers, means for supporting said stabilizers in a position defining a relative great angle of incidence and high aspect ratio, and means for decreasing said angle of incidence as aspect ratio at relatively high airplane speeds.

5. An airplane as defined in claim 2 including a pair of horizontal tail stabilizers, means for supporting said stabilizers in a position defining a relatively great angle of incidence and high aspect ratio, and means for decreasing said angle of incidence and aspect ratio in response to movement of said wings.

6. An airplane as defined in claim 2 including a pair of horizontal tail stabilizers, means for supporting said stabilizers in a position defining a relatively great angle of incidence and high aspect ratio, means for decreasing said angle of incidence and aspect ratio in response to movement of said wings, and a generally triangular filler airfoil disposed between each stabilizer and said fuselage and extending into a recess in the stabilizer as the latter adjusts to sweepback position.

7. In an airplane of the character described,
 (a) a fuselage,
 (b) a pair of wings pivotally supported on a pivot axis by said fuselage near their entering edges,
 (c) the said pivot axis defining an angle to the vertical in a plane transverse to the fuselage and an angle to the vertical in a plane running longitudinally of the fuselage,
 (d) said pivot axis causing said wings to define a high angle of incidence and dihedral angle at maximum aspect ratios, whereby stable low landing and take-off speeds are normal,
 (e) said wings automatically pivoting to sweepback position with low angle of incidence and low aspect ratio as air speed increases,
 (f) a generally triangular filler airfoil pivoted to each wing and movable into an end recess in such wing as it moves to sweepback position, and
 (g) spring means disposed in said end recess biasing said wings to forward landing position.

References Cited

UNITED STATES PATENTS

| 1,171,162 | 2/1916 | Alday | 244—46 |
| 1,567,531 | 12/1925 | Magni | 244—44 |
| 2,428,934 | 10/1947 | Gille et al. | 244—46 |
| 2,459,009 | 1/1949 | Wallis | 244—46 X |
| 2,744,698 | 5/1956 | Baynes | 244—43 X |
| 2,794,608 | 6/1957 | Johnson | 244—46 |

FOREIGN PATENTS

| 18,611 | 8/1910 | Great Britain. |
| 894,365 | 4/1962 | Great Britain. |

MILTON BUCHLER, *Primary Examiner.*

B. BELKIN, *Assistant Examiner.*